(12) United States Patent
Yamamoto et al.

(10) Patent No.: US 8,731,131 B2
(45) Date of Patent: *May 20, 2014

(54) METHOD OF REDUCING CORROSION OF NUCLEAR REACTOR STRUCTURAL MATERIAL

(75) Inventors: Seiji Yamamoto, Setagaya-ku (JP); Tadasu Yotsuyanagi, Yokohama (JP); Nagayoshi Ichikawa, Kawasaki (JP); Tetsuo Oosato, Shinjuku-Ku (JP); Masato Okamura, Yokohama (JP); Junichi Takagi, Yokohama (JP); Kenji Yamazaki, Yokohama (JP); Shunichi Suzuki, Chiyoda-Ku (JP); Kenro Takamori, Chiyoda-Ku (JP); Mitsuru Sambongi, Chiyoda-Ku (JP); Takeshi Shibano, Chiyoda-Ku (JP); Takashi Hirano, Chiyoda-Ku (JP); Yuichi Fukaya, Chiyoda-Ku (JP)

(73) Assignees: Kabushiki Kaisha Toshiba, Tokyo (JP); Ishikawajima-Harima Heavy Industries Co., Ltd., Tokyo (JP); The Tokyo Electric Power Company, Incorporated, Tokyo (JP)

(*) Notice: Subject to any disclaimer, the term of this patent is extended or adjusted under 35 U.S.C. 154(b) by 0 days.

This patent is subject to a terminal disclaimer.

(21) Appl. No.: 13/619,377

(22) Filed: Sep. 14, 2012

(65) Prior Publication Data

US 2013/0070888 A1  Mar. 21, 2013

Related U.S. Application Data

(62) Division of application No. 11/008,288, filed on Dec. 10, 2004, now Pat. No. 8,295,426.

(30) Foreign Application Priority Data

Dec. 26, 2003 (JP) .................. 2003-435120

(51) Int. Cl.
*G21C 15/28* (2006.01)
(52) U.S. Cl.
USPC .......................................... 376/305
(58) Field of Classification Search
USPC .......................................... 376/305
See application file for complete search history.

(56) References Cited

U.S. PATENT DOCUMENTS 4,297,150 A * 10/1981 Foster et al. .................. 148/276
4,842,812 A *  6/1989 Panson et al. ................. 376/306

(Continued)

FOREIGN PATENT DOCUMENTS

| DE | 100 30 726 A1 * | 4/2001 |
| EP | 0 736 878 B1 * | 10/1996 |
| EP | 1 339 071 A1 * | 8/2003 |
| JP | 62-254099 * | 11/1987 |

(Continued)

OTHER PUBLICATIONS

JPO Action re: 2003-435120 dated Apr. 17, 2009.*

(Continued)

*Primary Examiner* — Jack W Keith
*Assistant Examiner* — Sean P Burke
(74) *Attorney, Agent, or Firm* — Oblon, Spivak, McClelland, Maier & Neustadt, L.L.P.

(57) ABSTRACT

In a method of reducing corrosion of a material constituting a nuclear reactor structure, an electrochemical corrosion potential is controlled by injecting a solution or a suspension containing a substance generating an excitation current by an action of at least one of radiation, light, and heat existing in a nuclear reactor, or a metal or a metallic compound forming the substance generating the excitation current under the condition in the nuclear reactor to allow the substance generating the excitation current to adhere to the surface of the nuclear reactor structural material, and by injecting hydrogen in cooling water of the nuclear reactor while controlling the hydrogen concentration in a feed water.

8 Claims, 8 Drawing Sheets

(56) References Cited

U.S. PATENT DOCUMENTS

| | | | | |
|---|---|---|---|---|
| 4,927,598 A | * | 5/1990 | Nishino et al. | 376/306 |
| 5,028,384 A | * | 7/1991 | Skarpelos et al. | 376/306 |
| 5,130,080 A | * | 7/1992 | Niedrach | 376/305 |
| 5,377,245 A | * | 12/1994 | Uetake et al. | 376/305 |
| 5,602,888 A | * | 2/1997 | Hettiarachchi et al. | 376/305 |
| 5,608,766 A | * | 3/1997 | Andresen et al. | 376/305 |
| 5,715,290 A | * | 2/1998 | Uetake et al. | 376/306 |
| 5,768,330 A | * | 6/1998 | Andresen et al. | 376/305 |
| 5,774,516 A | * | 6/1998 | Hettiarachchi et al. | 376/305 |
| 5,793,830 A | * | 8/1998 | Kim et al. | 376/305 |
| 5,904,991 A | * | 5/1999 | Hettiarachchi | 428/472.1 |
| 6,606,368 B2 | * | 8/2003 | Takamori et al. | 376/305 |
| 6,940,939 B1 | * | 9/2005 | Ichikawa et al. | 376/305 |

FOREIGN PATENT DOCUMENTS

| | | | |
|---|---|---|---|
| JP | 07-270592 | * | 10/1995 |
| JP | 2624906 | * | 4/1997 |
| JP | 2001-004789 | * | 1/2001 |
| JP | 2001-228289 | * | 8/2001 |
| JP | 2001-276628 | * | 10/2001 |
| JP | 2002-071883 | * | 3/2002 |
| JP | 2003-139889 | * | 5/2003 |
| JP | 2003-139891 | * | 5/2003 |
| JP | 2003-232886 | * | 8/2003 |
| JP | 2005-003565 | * | 1/2005 |

OTHER PUBLICATIONS

JPO Action re: 2003-435120 dated Dec. 5, 2008.*

* cited by examiner

METHOD OF REDUCING CORROSION OF NUCLEAR REACTOR STRUCTURAL MATERIAL

CROSS-REFERENCE TO RELATED APPLICATIONS

This application is a divisional application of, and claims the benefit of priority under 35 U.S.C. §120 from, U.S. application Ser. No. 11/008,288, filed Dec. 10, 2004, herein incorporated by reference, which claims the benefit of priority under 35 U.S.C. §119 from Japanese Patent Application No. 2003-435120, filed Dec. 26, 2003.

BACKGROUND OF THE INVENTION

1. Field of the Invention

The present invention relates to a method of reducing corrosion of a nuclear reactor structural material composed of a stainless steel or a nickel-base alloy, which is used in a nuclear power plant such as boiling water reactor (BWR).

2. Related Art

In a boiling water reactor (BWR) plant widely operated in the world, the cooling water contains a high concentration of oxidizing species or oxidizers such as oxygen and hydrogen peroxide which are generated by radiolysis of reactor water. Therefore, it is known that stress corrosion cracking (SCC) or intergranular stress corrosion cracking (IGSCC) occurs to a material such as a stainless steel or a nickel-base alloy used as a material constituting a nuclear reactor structure (which is called as a nuclear reactor structural material hereinlater) in the nuclear power plants. The generation of such SCC or IGSCC and the crack growth depend on the electrochemical corrosion potential (ECP). The electrochemical corrosion potential is decreased by reducing the concentration of oxygen and hydrogen peroxide, thereby suppressing the stress corrosion cracking and the crack growth.

In order to prevent such stress corrosion cracking (SCC) or intergranular stress corrosion cracking (IGSCC) (which may be merely referred to as SCC hereinlater), the following operations or techniques have been performed in nuclear power plants around the world.

That is, in a hydrogen water chemistry (HWC), a concentration of oxygen and hydrogen peroxide in a nuclear reactor water is reduced by injecting hydrogen in the feed water.

On the other hand, a noble metal such as Pt and Rh is deposited or adhered to the surface of a nuclear reactor structural material in advance, and the hydrogen is injected (see, for example, "Genshirosui kagaku hando bukku" (Handbook of nuclear reactor water chemistry) edited by Atomic Energy Society of Japan, Corona Publishing Co., Ltd., Dec. 27, 2000, p. 210, and Japanese Patent No. 2624906). In addition, for example, Japanese Unexamined Patent Application Publication No. HEI 07-270592 discloses an anticorrosion technique in which titanium oxide, which is known as a photocatalyst, is deposited to a material. Japanese Unexamined Patent Application Publication No. 2001-4789 discloses a technique combined a photocatalyst, a noble metal, and hydrogen injection.

In the known methods of reducing corrosion described above, the following inconveniences or problems have been provided.

For example, it is known that the reactor water in a nuclear reactor becomes a reducing condition by the hydrogen injection. The reactor water contains nitrogen compounds composed of radioactive nitrogen (N-16) generated by nuclear transformation of oxygen. These compounds including soluble substances such as a nitrate ion and a nitrite ion are changed into volatile ammonia under the reducing atmosphere in the reactor water. Unfortunately, the resultant ammonia flows into a main steam, thereby increasing the dose rate in the turbine system. Furthermore, since the injected hydrogen flows into an off-gas system, it is necessary to carry out a reaction to recombine the hydrogen with oxygen, and therefore, additional equipment is required.

On the other hand, the noble metal chemical addition is advantageous in that even a small amount of hydrogen injection can reduce the corrosion, compared with the hydrogen injection mentioned above. However, in order to allow a noble metal to adhere to a nuclear reactor structural material, a solution containing the noble metal must be injected in the nuclear reactor water. As a result, the noble metal also adheres to the surface of a fuel cladding tube composed of a zirconium alloy. This adhesion causes corrosion of the fuel material or increases the amount of hydrogen absorption.

In addition, at a portion to which the noble metal is deposited, when the hydrogen molar concentration is double or more of the oxygen molar concentration, the corrosion potential of the material drastically decreased. As a result, the material shows a very low potential, for example, −500 mV. Such a significant decrease in the corrosion potential impairs the stability of the oxide film formed on the surface of the material. As a result, radioactive metal oxides on the surface of the film or in the film are released in the reactor water.

Moreover, when the above noble metal chemical addition is performed in nuclear power plants, a large amount of noble metal adheres to a zirconium oxide film of the fuel. As a result, this adhesion increases the oxidation and hydrogenation of the fuel material. Furthermore, when the recombination of hydrogen with oxygen is performed on the surface of the noble metal, and the oxygen concentration in the reactor water is decreased, the dose rate in the turbine system is increased.

As described above, the noble metal chemical addition causes negative effects in the water quality conservation, the decrease in the flowing of radioactivity and the increase in burn-up of the fuel. In order to eliminate such negative effects, the development of a method of decreasing the injection amount of the noble metal or a method using an alternative substance of the noble metal is desired.

On the other hand, in the anticorrosion methods using a photocatalyst, the inconveniences or problems caused in the hydrogen injection or the noble metal chemical addition do not occur. However, as described in Japanese Unexamined Patent Application Publication No. HEI 07-270592, No. 2001-4789, and No. 2001-276628, in order to reduce the corrosion, SCC mitigation using a photocatalyst require light or radiation to excite the photocatalyst. Therefore, the application range of anticorrosion is limited to a structural material in the reactor such as a shroud, and unfortunately, a sufficient anticorrosion effect cannot be expected in other components such as primary loop recirculation system piping.

SUMMARY OF THE INVENTION

In consideration of the above circumstances encountered in the prior art, it is an object of the present invention to provide a method of reducing corrosion of a nuclear reactor structural material, in which an amount of hydrogen injection for preventing stress corrosion cracking is decreased to thereby suppress the flowing of radioactivity into a turbine system, to decrease an amount of excessive hydrogen in an off-gas system, to suppress melting of metal oxides in the vicinity of a noble metal, the melting being caused by the adhesion of the noble metal, and also to reduce a corrosion of a fuel material so as to suppress the increasing in the amount of hydrogen absorption.

Another object of the present invention is to provide a method of reducing corrosion of a nuclear reactor structural material in a nuclear reactor, particularly, BWR, plants, capable of suppressing the stress corrosion cracking by decreasing an electrochemical corrosion potential of the material under a condition of reducing the amount of hydrogen injection for suppressing the material corrosion.

These and other objects can be achieved according to the present invention by providing, in one aspect, a method of reducing corrosion of a material constituting a nuclear reactor structure comprising the steps of:

injecting a solution or a suspension containing a substance generating an excitation current by an action of at least one of radiation, light and heat existing in a nuclear reactor, or a metal or a metallic compound forming the substance generating an excitation current under a condition in a nuclear reactor;

depositing the substance generating the excitation current to a surface of the material of the nuclear reactor structure; and injecting hydrogen in a nuclear reactor water while controlling a hydrogen concentration in a feed water to thereby control a corrosion potential.

In the method of this aspect, it may be desired that the corrosion potential is controlled in a range of −0.4 V vs. SHE to −0.1 V vs. SHE. The notation "V vs. SHE" represents the potential measured by using a standard hydrogen electrode (SHE) as a standard.

The substance generating the excitation current may be at least one of substances selected from $TiO_2$, $ZrO_2$, $ZnO$, $WO_3$, $PbO$, $BaTiO_3$, $Bi_2O_3$, $SrTiO_3$, $Fe_2O_3$, $FeTiO_3$, $KTaO_3$, $MnTiO_3$, $SnO_2$, and $Nb_2O_5$. The solution or the suspension may be injected in at least one of a feed water system, an outlet of a reactor water clean-up system, a primary loop recirculation system and a residual heat removal system. The hydrogen may be injected in at least one of a feed water system, an outlet of a reactor water clean-up system, a primary loop recirculation system and a residual heat removal system.

It may be desired that the solution or the suspension is injected when the nuclear reactor is started up or when the nuclear reactor is shut down, and the hydrogen is injected while the nuclear reactor is operated.

Hydrogen may be added to the solution or the suspension in advance, and the solution or the suspension is injected in the cooling water while the nuclear reactor is operated.

The adhesion amount of the substance generating the excitation current on the surface of the nuclear reactor structural material is preferably in a range of 10 to 200 μg/cm².

The hydrogen concentration in a feed water of hydrogen to be injected in the cooling water of the nuclear reactor is 0.2 to 1 ppm.

The adhesion amount of the substance generating the excitation current on a surface of the nuclear reactor structural material is monitored, and the hydrogen concentration in a feed water is controlled in accordance with the adhesion amount.

According to the method of reducing corrosion of a nuclear reactor structural material of the present invention in the above aspect, the electrochemical corrosion potential can be controlled to an adequate potential with a small amount of hydrogen injection. Therefore, the corrosion of the nuclear reactor structural material can be effectively reduced, while preventing the increase in dose rate in the turbine system or the flowing of hydrogen into the off-gas system.

In another aspect of the present invention, there is also provided a method of reducing corrosion of a material constituting a nuclear reactor structure comprising the steps of:

applying a substance generating an excitation current and a noble metal to a surface of a material constituting a nuclear reactor structure in advance; and controlling a concentration of oxidizing chemical species and a concentration of reducing chemical species in a nuclear reactor water so that a molar ratio of $H_2/O_2$ is less than a value of 2 in which a catalytic reaction to recombine the oxidizing chemical species with the reducing chemical species is not accelerated by the noble metal.

In preferred embodiments of this aspect, it may be desired that the substance generating the excitation current is at least one of compounds selected from $TiO_2$, $ZrP_2$, $ZnO$, $WO_3$, $PbO$, $BaTiO_3$, $Bi_2O_3$, $SrTiO_3$, $Fe_2O_3$, $FeTiO_3$, $KTaO_3$, $MnTiO_3$, $SnO_2$, and $Nb_2O_5$.

The noble metal is preferably at least one of elements selected from Pt, Pd, Ir, Rh, Os, and Ru.

The substance generating an excitation current and the noble metal is applied by at least one of methods selected from chemical injection, flame coating, spraying, plating, and vapor deposition.

A concentration of oxidizing chemical species and a concentration of reducing chemical species in a nuclear reactor water may be controlled so that a molar ratio of $H_2/O_2$ is less than a value of 2 by injecting hydrogen from a feed water system or a condensate system. A hydrogen concentration in the feed water or the condensate system is not less than 0.07 ppm and less than 0.16 ppm. The noble metal is applied before the application of the substance generating the excitation current.

The substance generating the excitation current and the noble metal are applied at the same time or before the application of the noble metal. An electrochemical corrosion potential of the nuclear reactor structural material composed of a stainless steel is preferably controlled to be −0.23 V vs. SHE or less. An electrochemical corrosion potential of the nuclear reactor structural material composed of a nickel-base alloy is preferably controlled to be −0.1 V vs. SHE or less.

According to this aspect, the stress corrosion cracking can be also suppressed by decreasing an electrochemical corrosion potential of the material under a condition that the amount of hydrogen injection for suppressing the material corrosion is reduced. In addition, the dose rate in the turbine system which was a problem in the prior art can be effectively prevented from increasing, thus being advantageous.

The nature and further characteristic features of the present invention will be made more clear from the following descriptions made with reference to the accompanying drawings.

DESCRIPTION OF THE PREFERRED EMBODIMENT

Preferred embodiments of a method of reducing corrosion of a nuclear reactor structural material according to the present invention will be described in detail with reference to the accompanying drawings.

First Embodiment

A first embodiment of the method of reducing corrosion of a material constituting a nuclear reactor structure (which may be called hereunder "nuclear reactor structural material") according to the present invention will be first described with reference to FIGS. 1 to 4.

Figure 1:
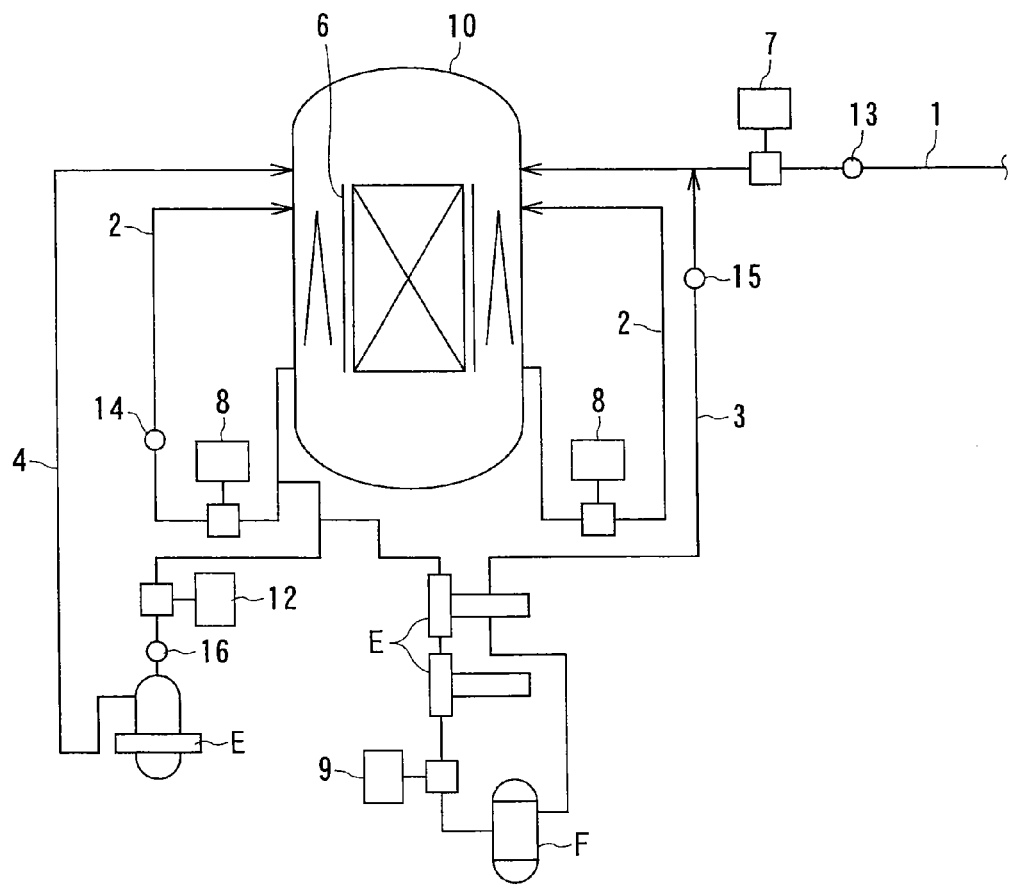
FIG. 1 is a schematic diagram of a circulating system of cooling water in a nuclear power plant.

FIG. 1 shows a circulating system of reactor water in a nuclear power plant. This reactor water circulating system includes a reactor pressure vessel 10, a feed water system piping 1, a primary loop recirculation (PLR) system piping 2, a reactor water clean-up (RWCU) system piping 3, and a residual heat removal (RHR) system piping 4. Examples of a nuclear reactor structural material forming the reactor pressure vessel 10 include materials of a shroud 6 shown in FIG. 1, a core support plate, and a grid plate. The method of reducing corrosion of a nuclear reactor structural material of the present invention can be applied to such materials.

A feed water pump 7 is disposed in the feed water system piping 1. This feed water pump 7 sends cooling water from the feed water system piping 1 to the reactor pressure vessel 10. A part or portion of the cooling water circulates in the primary loop recirculation (PLR) system piping 2 with a primary loop recirculation (PLR) pumps 8. A part or portion of the cooling water in the primary loop recirculation (PLR) system piping 2 circulates in the reactor water clean-up (RWCU) system piping 3 with a reactor water clean-up (RWCU) system pump 9. In addition, a part or portion of the cooling water in the primary loop recirculation (PLR) system piping 2 circulates the residual heat removal (RHR) system piping 4 with a residual heat removal (RHR) system pump 12. A heat exchanger E and a filter demineliizer F are disposed in the reactor water clean-up (RWCU) system piping 3 to purify the cooling water.

Injection points or sections 13, 14, 15, and 16 are disposed in the feed water system piping 1, the primary loop recirculation (PLR) system piping 2, the reactor water clean-up (RWCU) system piping 3, and the residual heat removal (RHR) system piping 4, respectively, so as to connect an injection system of titanium oxide and hydrogen thereto.

Figure 2:
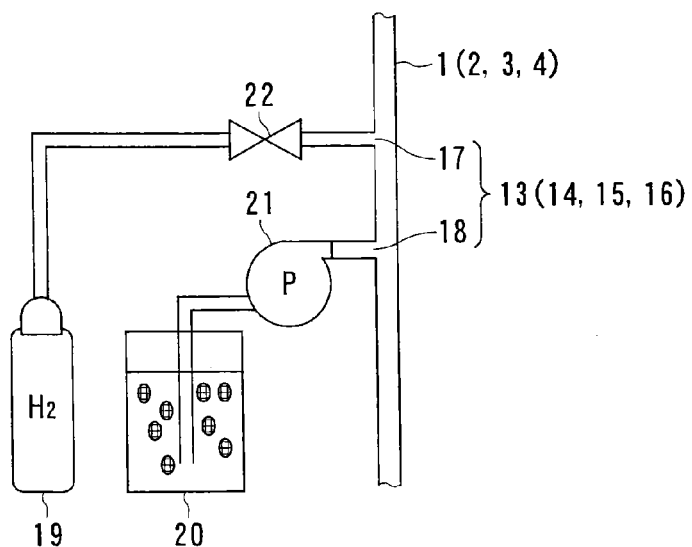
FIG. 2 is a view showing the structure of an injection system of titanium oxide and hydrogen.

FIG. 2 is an illustration showing the structure of the injection system of titanium oxide and hydrogen. This injection system of titanium oxide and hydrogen includes a hydrogen gas injection unit 19 and a titanium oxide solution injection unit 20. This injection system is connected to at least one or one portion of the feed water system piping 1, the primary loop recirculation (PLR) system piping 2, the reactor water clean-up (WCU) system piping 3, and the residual heat removal (RHR) system piping 4. Each of the injection points 13, 14, 15, and 16 includes a pair of a hydrogen injection point 17 and a titanium oxide injection point 18. The hydrogen gas injection unit 19 is connected to the hydrogen injection point 17, and the titanium oxide solution injection unit 20 is connected to the titanium oxide injection point 18.

Accordingly, a hydrogen gas and a titanium oxide solution can be supplied at the same time or separately. The hydrogen injection point 17 and the titanium oxide injection point 18 may be disposed adjacently or separately.

Instead of the steel cylinder equipment shown in FIG. 2, the hydrogen gas injection unit 19 may be, for example, electrolysis equipment of water to form a supply system of hydrogen.

A titanium oxide solution in the titanium oxide solution injection unit 20 is injected from the titanium oxide injection point 18 with an injection pump 21 and then circulates in the nuclear reactor with reactor water. As a result, titanium oxide adheres to the surfaces of the nuclear reactor structural materials such as shroud 6. On the other hand, the hydrogen gas is injected from the hydrogen injection point 17 and also circulates in the nuclear reactor with the reactor water. The amount of the hydrogen gas injection can be controlled with a flow control valve 22. Thus, the hydrogen concentration can be controlled with the volume of water flowing in the piping. The injection of the titanium oxide solution and hydrogen gas can be performed at any time, for example, when the nuclear reactor is started up, when the nuclear reactor is shut down, or while the nuclear reactor is operated. Hydrogen gas may be added to the titanium oxide solution in advance. The resultant solution may be injected in the cooling water to supply hydrogen gas and titanium oxide at the same time.

Figure 3:
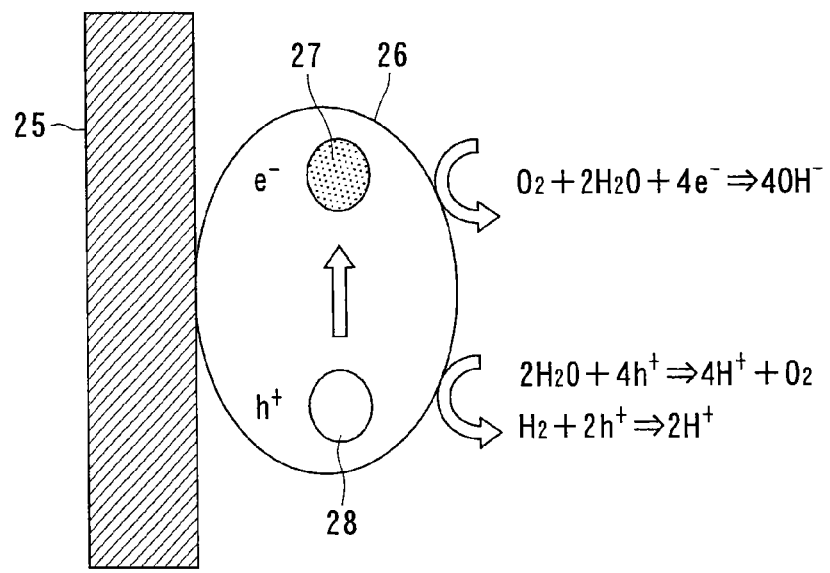
FIG. 3 is a schematic view showing a mechanism of an oxidation-reduction reaction on the surface of titanium oxide.

FIG. 3 schematically shows a mechanism of an oxidation-reduction reaction on the surface of the titanium oxide adhering to a nuclear reactor structural material.

The titanium oxide 26 adhering to the surface of the structural material 25 composed of a stainless steel is excited with heat so as to generate an electron 27 ($e^-$) and a hole 28 ($h^+$). A part of electrons 27 and holes 28 are recombined. However, in the presence of hydrogen, the oxidizing reaction of the hydrogen with the hole 28 is accelerated. As a result, an anode current on the surface of the structural material 25 is increased.

Figure 4:
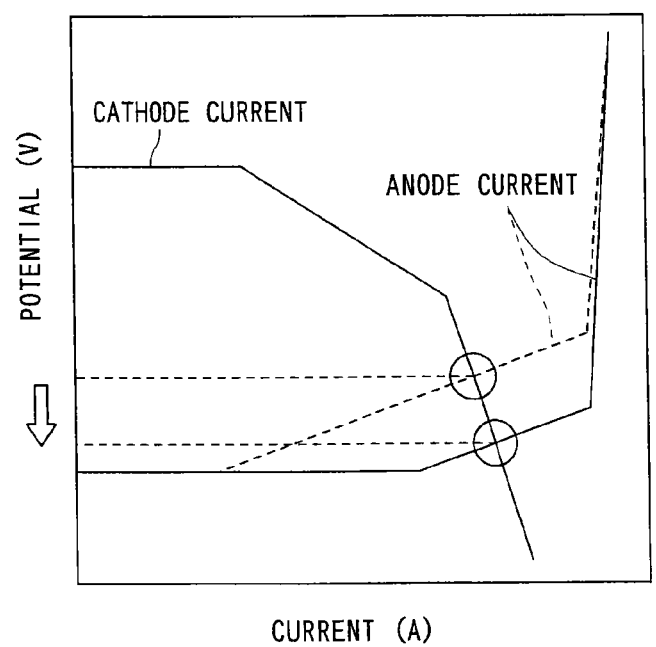
FIG. 4 is an Evans diagram showing a relationship between an anode current, a cathode current, and the corrosion potential.

FIG. 4 shows an Evans diagram with which a corrosion potential of a material is defined. The corrosion potential is defined at a point where an anode current and a cathode current are balanced. According to the method of reducing corrosion of a nuclear reactor structural material of the present invention, when the titanium oxide and the hydrogen are injected in the cooling water, as schematically shown in FIG. 4, the anode current represented by the broken line is increased to that represented by the continuous line. As a result, the potential at the intersection of the anode current and the cathode current moves in the negative direction, and the corrosion potential is decreased. Accordingly, corrosion of the nuclear reactor structural material is reduced.

Second Embodiment

A second embodiment of the present invention will be described hereunder with reference to FIGS. 5 to 10.

Figure 5:
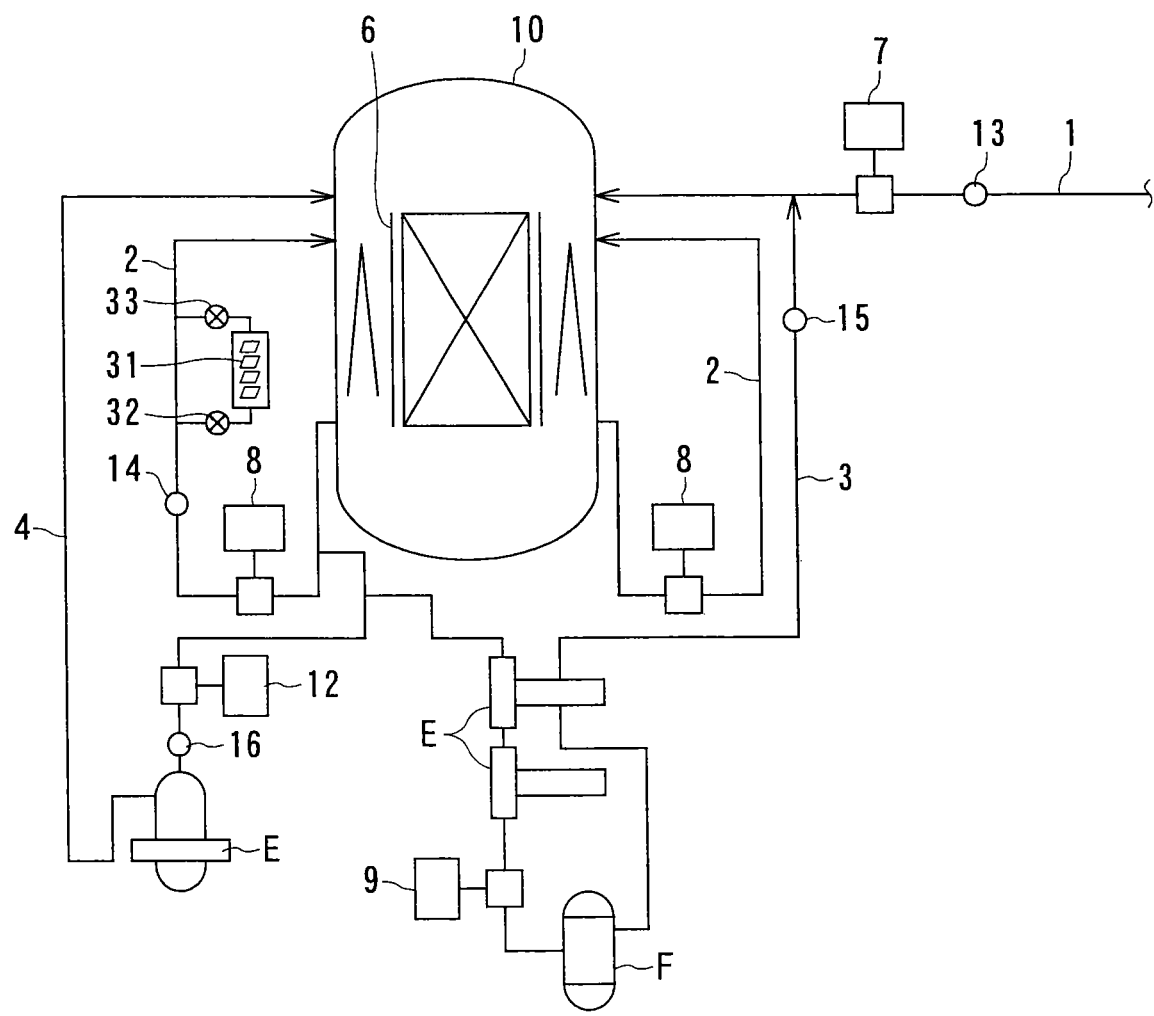
FIG. 5 is a schematic diagram of a circulating system of cooling water in a nuclear power plant.

FIG. 5 shows a circulating system of cooling water in a nuclear power plant. In this circulating system, equipment for setting test pieces for sampling is connected to the circulating system shown in FIG. 1. In FIG. 5, the same components as those in FIG. 1 have the same reference numerals. The description of the structure composed of the same components is omitted herein.

Referring to FIG. 5, test pieces 31 for monitoring the adhesion amount are disposed in a branch line formed in the vicinity of the injection point 14 of the primary loop recirculation (PLR) system pipe 2. Valves 32 and 33 (e.g., stop valves), which can isolate the test pieces 31 from the circulating system during sampling, are disposed at the upstream and the downstream of the branch line including the test pieces 31.

The adhesion amount of the titanium oxide to the structural material is monitored in the following manner. A titanium oxide solution is injected while the valves 32 and 33 are opened. After a predetermined period of time, the valves 32 and 33 are closed and the test pieces 31 are then removed. The adhesion amount of titanium oxide to the test pieces 31 is evaluated by fluorescent X-ray analysis or Inductively Coupled Plasma Mass Spectrometer (ICP-MS). Regarding hydrogen injection, the hydrogen concentration in cooling water can be controlled by regulating the flow volume of hydrogen gas.

The reasons or grounds for the numerical limitation in the method of reducing corrosion of a nuclear reactor structural material of the present invention are as follows.

Figure 6:
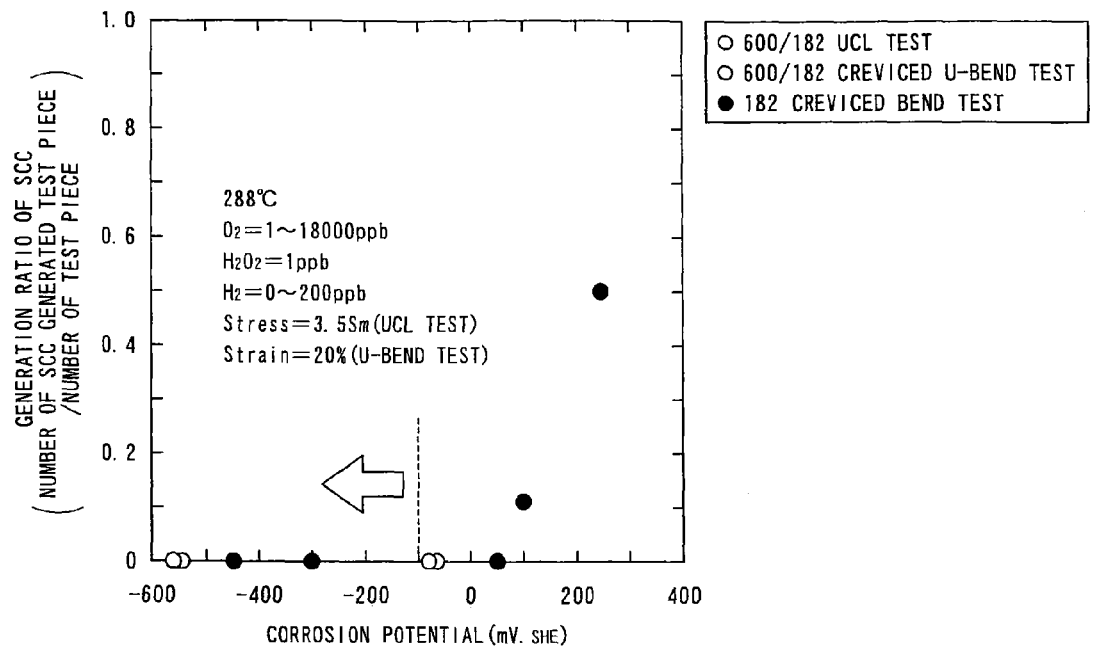
FIG. 6 is a graph showing a relationship between a generation ratio of SCC and the corrosion potential.

FIG. 6 shows a relationship between a generation ratio of stress corrosion cracking (SCC) of nickel-base alloys (Alloy 600 and Alloy 182) and the corrosion potential. The generation ratio of SCC is evaluated using three kinds of experimental methods including a uniaxial constant load (UCL) tensile test, a creviced U-bent beam test, and a creviced bent beam test. Alloy 600 and Alloy 182 are typical nickel-base alloys used as nuclear reactor structural materials.

As shown by an arrow in FIG. 6, when the corrosion potential of the above nickel-base alloys is −100 mV vs. SHE (−0.1 V vs. SHE) or less, the generation of SCC is suppressed under all the three kinds of the test conditions.

Figure 7:
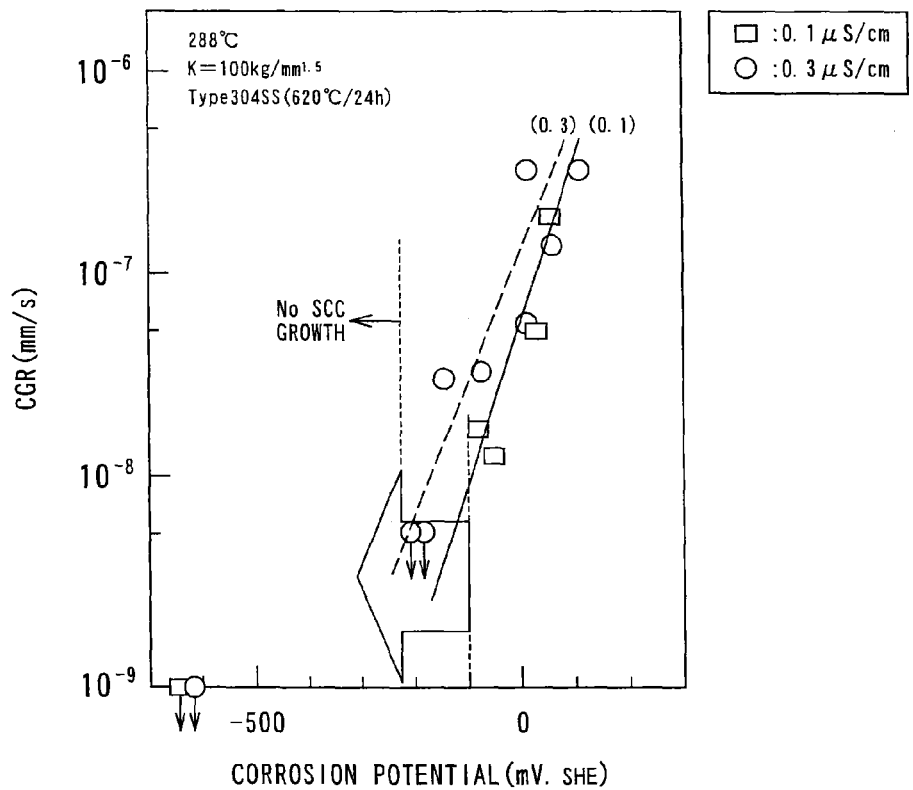
FIG. 7 is a graph showing a relationship between a crack growth rate of SCC and the corrosion potential.

FIG. 7 shows a relationship between a crack growth rate of sensitized type 304 stainless steel and the corrosion potential, the relationship being obtained by a cracking growth test. FIG. 7, which is cited from Corrosion vol. 53, No. 4, April 1997, pp. 306-311, shows data of type 304 stainless steel at a temperature of 288° C.

Referring to FIG. 7, in the condition of 0.1 μS/cm corresponding to the water quality in a BWR (shown by symbol □ in FIG. 7), when the corrosion potential is −100 mV vs. SHE (−0.1 V vs. SHE) or less, the cracking growth rate is sufficiently as low as $10^{-8}$ mm/s or less.

Figure 8:
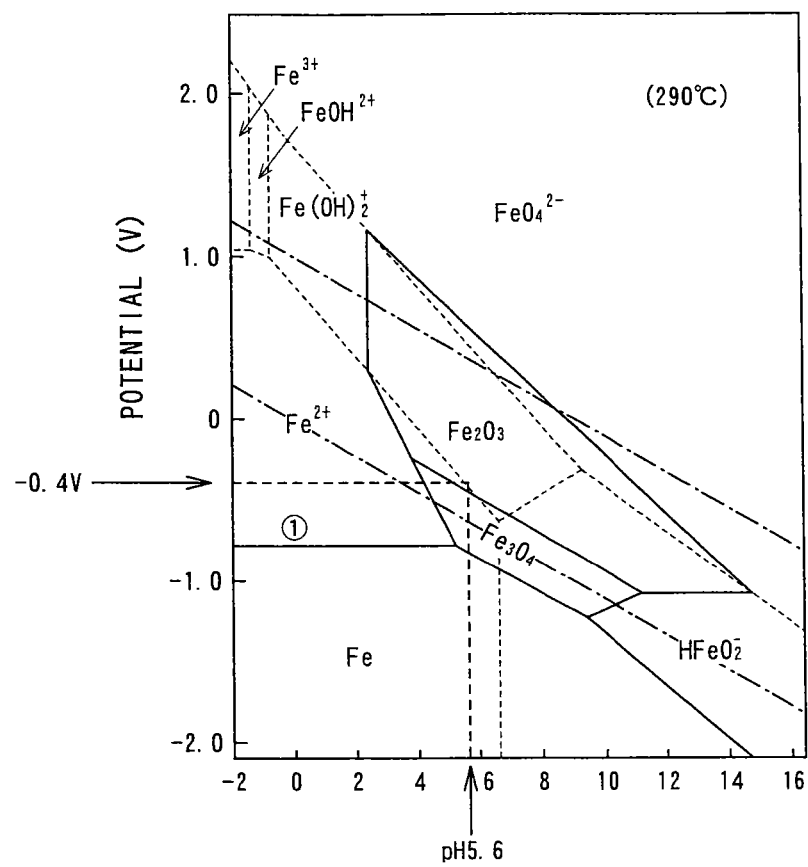
FIG. 8 is a potential-pH diagram of iron.

FIG. 8 shows a potential-pH diagram of iron (at 290° C.). As shown in FIG. 8, in neutral pH=5.6 at 290° C., an iron oxide $Fe_2O_3$ is stable in the range of −400 mV vs. SHE (−0.4 V vs. SHE) or more of the corrosion potential.

For these reasons, in the method of reducing corrosion of a nuclear reactor structural material according to the present invention, the range of corrosion potential is limited from −0.4 V vs. SHE to −0.1 V vs. SHE.

According to 1998 JAIF International Conference on Water Chemistry in Nuclear Power Plant Proceeding (p. 226), when the amount of hydrogen injection exceeds 1 ppm, the form of the iron oxide changes from stable $Fe_2O_3$ to $Fe_3O_4$. Therefore, the amount of hydrogen injection is preferably 1 ppm or less. Furthermore, in order to suppress the flowing of radioactive nitrogen into a turbine system, the amount of hydrogen injection is preferably 1 ppm or less.

As described above, preferably, the corrosion potential is controlled in the range of −0.4 V vs. SHE to −0.1 V vs. SHE in terms of the advantage of corrosion reduction. In addition, in order to solve the problem of the flowing of radioactive nitrogen, the amount of hydrogen injection is controlled to 1 ppm or less.

Figure 9:
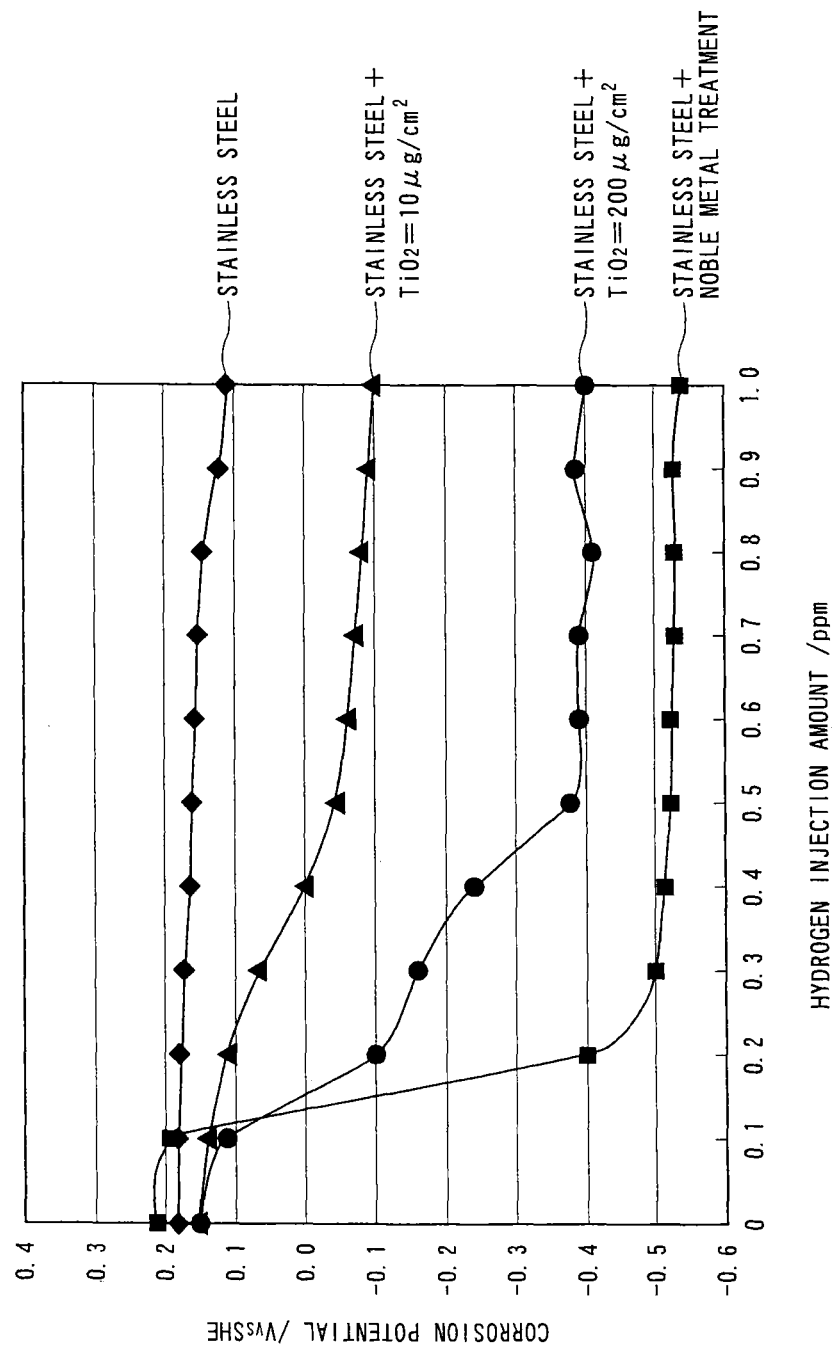
FIG. 9 is a graph showing a relationship between the amount of hydrogen injection and the corrosion potential.

The present inventors evaluated the effect of corrosion prevention in the method of reducing corrosion of a nuclear reactor structural material of the present invention. FIG. 9 shows a relationship between the amount of the hydrogen injection and the corrosion potential and also shows a measurement result of the change in corrosion potential of a stainless steel to the amount of the hydrogen supply. In this evaluation, the adhesion amount of titanium oxide was changed. FIG. 9 also shows data of a stainless steel treated with a noble metal as a comparative example.

Referring to the measurement result shown in FIG. 9, in the stainless steels treated with titanium oxide, the change in corrosion potential caused by hydrogen supply was gradual, compared with that of the stainless steel treated with a noble metal. However, the corrosion potential was obviously decreased as the amount of hydrogen injection increased. In the stainless steel having 10 μg/cm$^2$ of titanium oxide, when the amount of hydrogen injection was 1 ppm, the corrosion potential was decreased to −0.1 V vs. SHE.

On the other hand, in the stainless steel having 200 μg/cm$^2$ of the titanium oxide, when the amount of hydrogen injection was 0.2 ppm, the corrosion potential was decreased to −0.1 V vs. SHE. This result shows that the increase in the adhesion amount of titanium oxide decreased the corrosion potential. In addition, even when the amount of hydrogen supply was 0.5 ppm or more, the corrosion potential was not decreased to −0.4 V vs. SHE or less.

In view of the above considerations, in the method of reducing corrosion of a nuclear reactor structural material of the present invention, the adhesion amount of titanium oxide is limited from 10 to 200 μg/cm$^2$. The amount of hydrogen injection is limited from 0.2 to 1 ppm.

Figure 10:
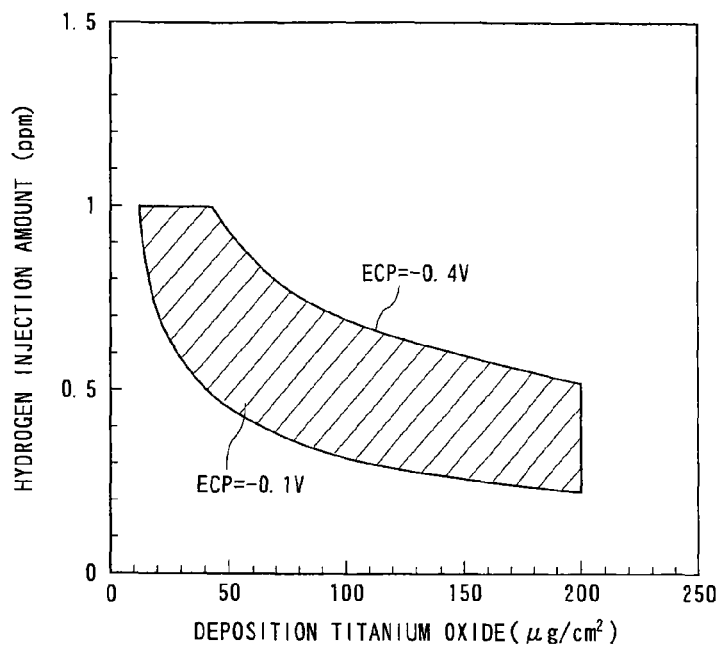
FIG. 10 is a diagram showing a relationship between the adhesion amount of titanium oxide, the amount of hydrogen injection, and the corrosion potential.

FIG. 10 shows a relationship between the adhesion amount of the titanium oxide, the amount of the hydrogen injection, and the corrosion potential. As shown in FIG. 10, the corrosion potential depends on the adhesion amount of the titanium oxide and the amount of the hydrogen injection. Accordingly, the adhesion amount of the titanium oxide is controlled in the range of 10 to 200 μg/cm$^2$, and the amount of the hydrogen injection is controlled in the range of 0.2 to 1 ppm. Thus, the electrochemical corrosion potential (ECP) can be controlled in the range of −0.4 V vs. SHE to −0.1 V vs. SHE.

As mentioned above, according to the described embodiments, the nuclear reactor is operated under the conditions of the adhesion or application amount of the titanium oxide and the amount of the hydrogen injection described above. As a result, problems such as the flowing of radioactive nitrogen, the release of radioactive metal oxides into the reactor water, and excessive hydrogen in an off-gas system, which are encountered in the prior art, can be prevented, and the stress corrosion cracking of the nuclear reactor structural material can be also suppressed.

Another Embodiment

The following is another embodiment of a method of reducing corrosion of a material constituting a nuclear reactor structure according to the present invention of an aspect which may be more general than the first and second embodiments mentioned above though the subject gist thereof is identical.

In this another embodiment of the present invention, too, a substance generating an excitation current is added or deposited to the surface of the nuclear reactor structural material, and a noble metal is applied or deposited to the material. The concentration of oxidizing chemical species and the concentration of reducing chemical species in the nuclear reactor water are controlled under a condition in which the noble metal is deposited.

In the above aspect of the present invention, the concentration of the reducing chemical species in the nuclear reactor water is controlled as follows. The molar ratio represented by $H_2/O_2$ is controlled to be less than the value of 2 (i.e., less than 0.16 ppm of the hydrogen concentration in a feed water) in which recombining catalytic reactions of various chemical species are not accelerated. Thus, the electrochemical corrosion potential (ECP) is decreased under the reducing atmosphere corresponding to a trace of the hydrogen injection. The noble metal adhering to the surface of the material achieves a role to take out the excitation current efficiently. At least one of elements selected from Pt, Pd, Ir, Rh, Os, and Ru is used as the noble metal.

A semiconductor is used as a typical substance excited with heat or light for generating an excitation current. At least one of compounds selected from $TiO_2$, $ZrO_2$, $ZnO$, $WO_3$, $PbO$, $BaTiO_3$, $Bi_2O_3$, $SrTiO_3$, $Fe_2O_3$, $FeTiO_3$, $KTaO_3$, $MnTiO_3$, $SnO_2$, and $Nb_2O_5$ is used as the semiconductor.

The substance generating an excitation current and the noble metal are applied or deposited to the nuclear reactor structural material by at least one of methods or treatments selected from chemical injection, flame spray coating, spraying, plating, and vapor deposition.

When a material having a semiconductor thereon is disposed, i.e., exposed, in a high temperature water or under an environment of ultraviolet irradiation, an excitation current is generated on the surface of the material. The potential on the surface of the material is referred to as electrochemical corrosion potential (ECP). This ECP is an indicator of the stress corrosion cracking (SCC) susceptibility of the material.

For example, in the high temperature water at 280° C., when the electrochemical corrosion potential is –230 mV (vs. SHE) or less, the stress corrosion cracking does not occur. In addition, a test result of the cracking growth under the same environment shows that the decrease in the potential significantly decreases the crack growth rate.

The electrochemical corrosion potential of a material is defined by two reactions, i.e., a reaction between reactants and a reaction of the material itself in the environment in which the material is exposed. For example, in the BWR plants, the former is an electrochemical reaction of oxygen, hydrogen peroxide, and hydrogen generated by radiolysis of water, and the electrochemical reaction is performed on the surface of the material. The latter is an elution reaction of the material itself.

The electrochemical corrosion potential, which is determined on the basis of a mixed potential theory, is a potential wherein the cathode current is equal to the anode current. Among the above reactants, oxygen and hydrogen peroxide contribute to the cathode reaction, whereas the hydrogen and the elution reaction of the material contribute to the anode reaction.

The standard oxidation-reduction potential in each electrochemical reaction is determined by the concentration of each reactant, the temperature, and the pH in the environment etc. The potential of the cathode reaction is higher than that of the anode reaction. Therefore, the acceleration of the cathode reaction increases the electrochemical corrosion potential. This also indicates that the increase in the concentration of oxygen and hydrogen peroxide increases the electrochemical corrosion potential.

On the other hand, the increase of the anode reaction decreases the electrochemical corrosion potential. Methods of reducing the cathode reaction includes a known method of controlling corrosion with a deoxidant and a method of decreasing the concentration of oxygen and hydrogen peroxide by hydrogen injection. On the other hand, a method of reducing corrosion by increasing the anode reaction includes a known method of decreasing the potential by allowing a noble metal to adhere to increase the hydrogen reaction.

In the method utilized for the present embodiment, the electrochemical corrosion potential is changed by increasing the anode current. A typical substance which increases the anode current is an n-type semiconductor. The thermal excitation of a general semiconductor is represented by the following formula:

$$n_i = n_0 \exp(-\epsilon g)/(2k_B T)$$

wherein $n_i$ represents a concentration of the pair of an electron and a hole generated by thermal excitation, $n_0$ represents a constant relating to the concentration of the electron at the top of the valence band, $\epsilon g$ represents a band gap, $k_B$ represents Boltzmann constant, and T represents a temperature.

In this embodiment, in particular, an n-type semiconductor is preferably used as the substance generating an excitation current. Accordingly, the excited electrons become an anode current for decreasing the electrochemical corrosion potential. As described above, $TiO_2$ is used as a typical n-type semiconductor in this method. The band gap of $TiO_2$ is about 3 eV. This indicates that, under ultraviolet irradiation, $TiO_2$ is excited with light having the wavelength of 410 nm or less. In other words, when Cherenkov light is generated in a nuclear reactor core, this light is also usable.

However, if the excitation current cannot be taken out efficiently, the electrons and the holes generated by the excitation are recombined. In this case, since the anode current is not increased, the electrochemical corrosion potential is not changing.

According to the technique used as the countermeasure in general industries, the yield of the excitation current is improved by allowing a noble metal typified by Pt for adhering in the vicinity of the substance generating the excitation current. In an environment of the reactor water in BWR plants, however, an observation is reported in which the electrochemical corrosion potential is unintentionally increased with Pt under an oxidizing condition without hydrogen injection. Accordingly, it is necessary to consider the balance between the improvement of the yield of the excitation current due to the adhesion of the noble metal and the effect in which the pressure Pt itself increases the electrochemical corrosion potential.

In order to suppress the increase in the electrochemical corrosion potential with Pt itself, it is effective to control the nuclear reactor water to be a reducing condition. A specific indicator to achieve this purpose, resides in that the molar ratio of hydrogen to oxygen in the reactor water exceeds 2.

However, when the molar ratio of hydrogen to oxygen in the reactor water is a value of 2 or more, N-16 in the reactor water is reduced and changed to a chemical form which easily flows into a vapor phase. In this case, the flowing of N-16 into a turbine system is increased. As a result, the dose rate in the turbine system during the plant operation will be increased. In order to reduce this negative effect, it is effective to shift the balance between hydrogen and oxygen in the reactor water to a reducing side such that the molar ratio represented by $H_2/O_2$ is less than a value of 2.

The increase in the electrochemical corrosion potential due to the noble metal can be suppressed by slightly changing the concentration of oxidizing chemical species and the concentration of reducing chemical species in the reactor water in the nuclear power plant (BWR). In addition, the recombination reaction of an electron and a hole after the generation of the excitation current can be suppressed using the noble metal. As a result, the electrochemical corrosion potential of the material can be effectively decreased.

According to the described embodiment, a substance, which is typified by an n-type semiconductor for generating an excitation current, and a noble metal are applied or deposited to the surface of the nuclear reactor structural material. In this state, the concentration of oxidizing chemical species and the concentration of reducing chemical species in the nuclear reactor water are controlled in an appropriate range. This method can reduce the electrochemical corrosion potential of the material without increasing the dose rate in the turbine system.

Examples of the method for reducing corrosion of a nuclear reactor structural material according to the above embodiment of the present invention will be described specifically with reference to FIGS. 11 to 13.

Firstly, a result of a slow strain rate test (SSRT) of a sensitized type 304 stainless steel at 280° C. will be described with reference to FIG. 11.

Figure 11:
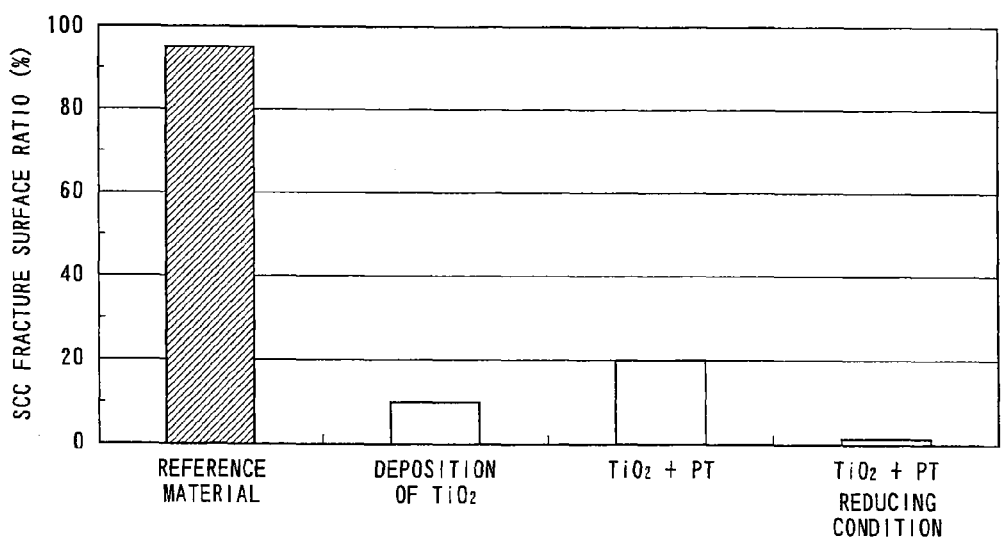
FIG. 11 is a bar chart explaining an advantage in an Example of a method of reducing corrosion of a nuclear reactor structural material according to one aspect of the present invention.

FIG. 11 shows a fracture surface ratio in the SSRT of test pieces having $TiO_2$ thereon and having $TiO_2$ and Pt thereon. FIG. 11 also shows advantage or advantageous function in a reducing condition. In FIG. 11, the ordinate represents a ratio of the area generating intergranular stress corrosion cracking (IGSCC) to the total fracture surface area after testing, i.e., a fracture surface ratio (%). When this value is high, the test piece is more susceptible to the stress corrosion cracking (SCC). The abscissa represents the kind of various test pieces.

In the test pieces, to which no specific description of the condition is given, the water quality was an oxidizing condition simulating an environment in the core of the BWR, and on the contrary, in the test piece, to which the specific description of the reducing condition is given, the water quality was a slightly reducing condition simulating an environment in the core of the BWR wherein 0.1 ppm of hydrogen was injected from the feed water.

A test piece composed of type 304 stainless steel, to which no coating or application was made, was used as a reference material. In addition, a test piece composed of type 304 stainless steel having $TiO_2$ thereon, and test pieces composed of type 304 stainless steel having $TiO_2$ and Pt thereon were used.

Referring to FIG. 11, the stress corrosion cracking (SCC) fracture surface ratio was significantly decreased by allowing $TiO_2$ and Pt to adhere to the type 304 stainless steel and controlling the condition to be a reducing condition.

The change in the chemical form of nitrogen compounds in the case where $TiO_2$ and Pt adhere will be described with reference to FIG. 12.

In the known techniques using hydrogen injection and a noble metal chemical addition, the increase in the dose rate is observed in a main steam piping. This is because the chemical form of radioactive nitrogen compounds in the reactor water changes to a reduced form such as ammonia and nitrogen monoxide.

Figure 12:
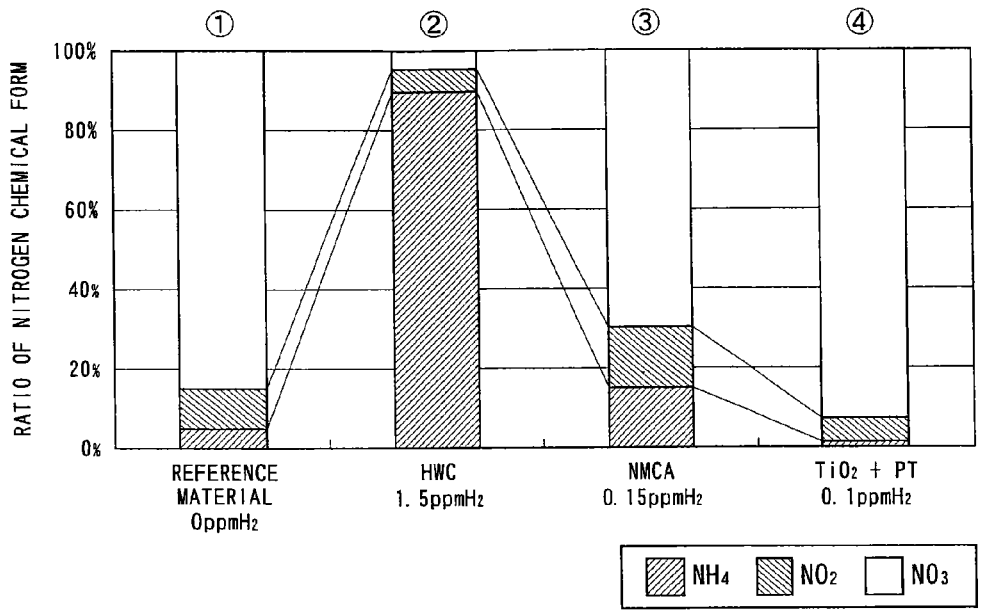
FIG. 12 is a bar chart showing the change in the chemical form of nitrogen compounds in the Example of the method according to the present invention.

FIG. 12 shows the test result in a laboratory for tracking the change in the form of nitrogen compounds. In FIG. 12, reference symbol ① represents an example using a reference material (type 304 stainless steel) with no hydrogen injection, reference symbol ② represents an example using type 304 stainless steel in 1.5 ppm of $H_2$ injection (hydrogen water chemistry (HWC)), reference symbol ③ represents an example using a noble metal in 0.15 ppm HWC condition (noble metal chemical addition (NMCA)), and reference symbol ④ represents an example using a type 304 stainless steel having $TiO_2$ and Pt thereon in 0.1 ppm HWC condition.

It was confirmed that nitrogen oxides were oxidized to nitric acid under the conditions of the present Example. As shown in FIG. 12, the result shows the fact that the amount of flowing of nitrogen compound into the vapor phase could be decreased.

The hydrogen concentration-dependency of the electrochemical corrosion potential shown by a test piece having $TiO_2$ and Pt thereon will be described with reference to FIG. 13.

Figure 13:
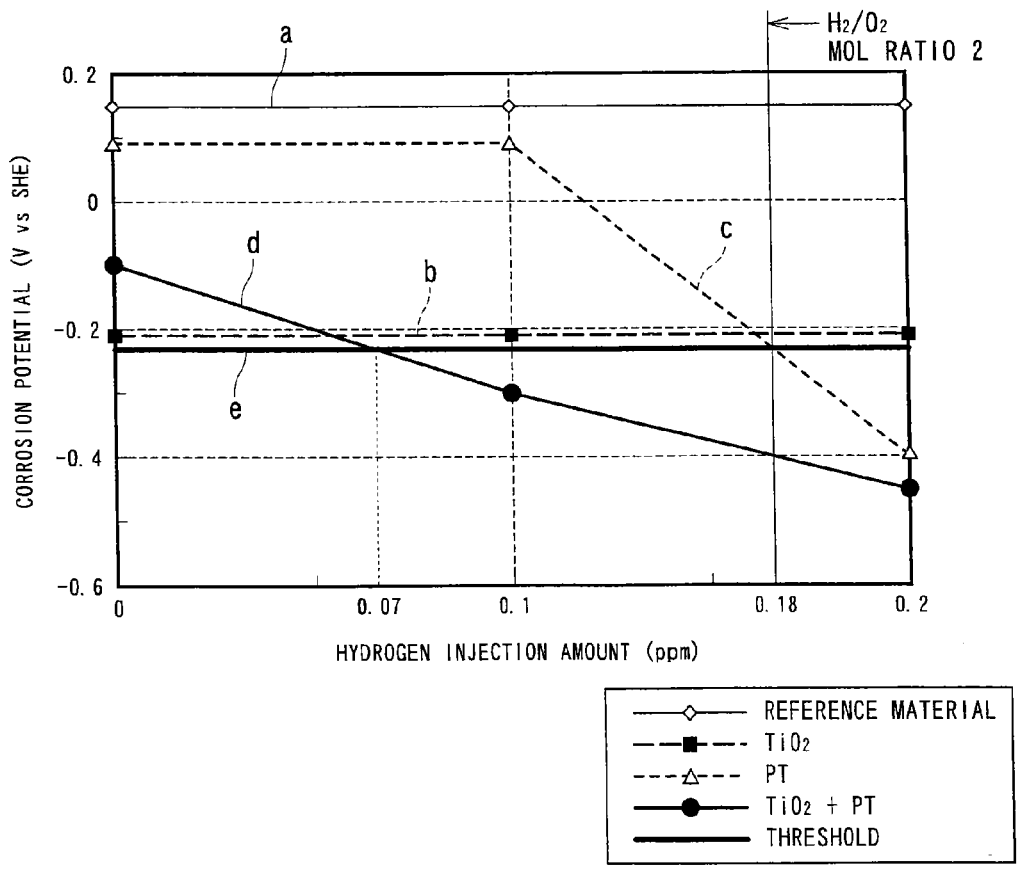
FIG. 13 is a characteristic diagram showing the hydrogen concentration-dependency of the electrochemical corrosion potential in the Example of the method according to the present invention.

FIG. 13 summarizes the result of the water-chemistry-dependency of the electrochemical corrosion potential (ECP) of a test piece composed of type 304 stainless steel having $TiO_2$ and Pt thereon, the result being measured by a laboratory test. In FIG. 13, the ordinate represents the electrochemical corrosion potential and the abscissa represents the hydrogen concentration in the feed water.

Under the normal water chemistry (NWC) for the reactor water, the electrochemical corrosion potential of type 304 stainless steel shown by a reference material a in FIG. 13 was about 0.15 V vs. SHE. In FIG. 13, the area in which the molar ratio of $H_2/O_2$ is less than the value of 2 corresponds to the area in which the hydrogen concentration in the feed water is less than 0.16 ppm. In this area, the catalytic reaction to recombine oxidizing chemical species with reducing chemical species is not accelerated by a noble metal.

Referring to FIG. 13, in a test piece b having only $TiO_2$ thereon, although the electrochemical corrosion potential was reduced to about −0.2 V vs. SHE regardless of the condition, the electrochemical corrosion potential was not reduced to −0.23 V vs. SHE, which was a threshold e for suppressing the IGSCC of the stainless steel. In a test piece c having only Pt thereon, when the hydrogen concentration in the feed water was less than 0.1 ppm, the electrochemical corrosion potential was barely reduced. The electrochemical corrosion potential was reduced in the range from 0.1 to 0.2 ppm of the hydrogen concentration. However, 0.16 ppm of the hydrogen concentration was required in order to reduce the electrochemical corrosion potential to −0.23 V vs. SHE.

In contrast, in a test piece d having $TiO_2$ and Pt thereon, which corresponded to the present Example, when the amount of the hydrogen injection was at least 0.07 ppm, the electrochemical corrosion potential was −0.23 V vs. SHE or less. This phenomenon could not be achieved with the test piece b having only $TiO_2$ thereon and the test piece c having only Pt thereon. This result indicates that the IGSCC of the structural material could be suppressed. Accordingly, the hydrogen concentration in the feed water should be at least 0.07 ppm and less than 0.16 ppm. This condition can suppress the stress corrosion cracking, and in addition, does not accelerate the catalytic reaction to recombine oxidizing chemical species with reducing chemical species by a noble metal.

It is to be noted that the present invention is not limited to the described embodiments and many other changes and modifications may be made without departing from the scopes of the appended claims.

What is claimed is:

1. A method of reducing corrosion of a material constituting a nuclear reactor structure comprising:

applying a substance capable of generating an excitation current and a noble metal to a surface of a material constituting a nuclear reactor structure in advance; and controlling a concentration of oxidizing chemical species and a concentration of reducing chemical species in a nuclear reactor water so that a molar ratio of $H_2/O_2$ is less than a value of 2 in which a catalytic reaction to recombine the oxidizing chemical species with the reducing chemical species is not accelerated by the noble metal, wherein the concentration of oxidizing chemical species and the concentration of reducing chemical species in the nuclear reactor water are controlled so that the molar ratio of $H_2/O_2$ is less than a value of 2 by injecting hydrogen from a feed water system or a condensate system, and a hydrogen concentration in water in the feed water system or the condensate system is not less than 0.07 ppm and is less than 0.16 ppm.

2. The method of reducing corrosion of a material constituting a nuclear reactor structure according to claim 1, wherein the substance generating the excitation current is at least one of compounds selected from $TiO_2$, $ZrO_2$, $ZnO$, $WO_3$, $PbO$, $BaTiO_3$, $Bi_2O_3$, $SrTiO_3$, $Fe_2O_3$, $FeTiO_3$, $KTaO_3$, $MnTiO_3$, $SnO_2$, and $Nb_2O_5$.

3. The method of reducing corrosion of a material constituting a nuclear reactor structure according to claim 1, wherein the noble metal is at least one of elements selected from Pt, Pd, Ir, Rh, Os, and Ru.

4. The method of reducing corrosion of a material constituting a nuclear reactor structure according to claim 1, wherein the substance generating an excitation current and the noble metal is applied by at least one of methods selected from chemical injection, flame spray coating, spraying, plating, and vapor deposition.

5. The method of reducing corrosion of a material constituting a nuclear reactor structure according to claim 4, wherein the noble metal is applied before the application or the adhesion of the substance generating the excitation current.

6. The method of reducing corrosion of a material constituting a nuclear reactor structure according to claim 4, wherein the substance generating the excitation current and the noble metal are applied at the same time or a substance generating the excitation current is applied before the application of the noble metal.

7. The method of reducing corrosion of a material constituting a nuclear reactor structure according to claim 1, wherein an electrochemical corrosion potential of the nuclear reactor structural material composed of a stainless steel is controlled to be −0.23 V vs. SHE or less.

8. The method of reducing corrosion of a material constituting a nuclear reactor structure according to claim 1, wherein an electrochemical corrosion potential of the nuclear reactor structural material composed of a nickel-base alloy is controlled to be −0.1 V vs. SHE or less.

* * * * *